No. 880,009. PATENTED FEB. 25, 1908.
G. F. BURTON.
ROTARY ENGINE.
APPLICATION FILED MAY 23, 1907.

Witnesses

Inventor
George F. Burton
by Wilkinson,
Fisher and
Witherspoon
Attorneys

No. 880,009. PATENTED FEB. 25, 1908.
G. F. BURTON.
ROTARY ENGINE.
APPLICATION FILED MAY 23, 1907.

No. 880,009. PATENTED FEB. 25, 1908.
G. F. BURTON.
ROTARY ENGINE.
APPLICATION FILED MAY 23, 1907.

No. 880,009. PATENTED FEB. 25, 1908.
G. F. BURTON.
ROTARY ENGINE.
APPLICATION FILED MAY 23, 1907.

No. 880,009. PATENTED FEB. 25, 1908.
G. F. BURTON.
ROTARY ENGINE.
APPLICATION FILED MAY 23, 1907.

UNITED STATES PATENT OFFICE.

GEORGE F. BURTON, OF WOODLAWN, ALABAMA, ASSIGNOR OF ONE-FOURTH TO LE ROY A. CHRISTIAN AND ONE-FOURTH TO CHARLES W. CRAM, BOTH OF WOODLAWN, ALABAMA.

ROTARY ENGINE.

No. 880,009.　　　Specification of Letters Patent.　　　Patented Feb. 25, 1908.

Application filed May 23, 1907. Serial No. 375,257.

*To all whom it may concern:*

Be it known that I, GEORGE F. BURTON, a citizen of the United States, residing at Woodlawn, in the county of Jefferson and State of Alabama, have invented certain new and useful Improvements in Rotary Engines; and I do hereby declare the following to be a full, clear, and exact description of the invention, such as will enable others skilled in the art to which it appertains to make and use the same.

My invention relates to improvements in rotary engines driven by steam, compressed air, or other fluid-pressure, in which there is a continuous torque maintained on the shaft and in which the valve mechanism is of extremely simple type and the wear and tear on the parts is reduced to a very small amount.

In the accompanying drawings I have shown the invention as applied to a two-cylinder direct-acting rotary engine, in which each cylinder is supplied with live steam from a common supply-pipe.

Heretofore, I have obtained Letters Patent No. 848,440, dated March 26, 1907, and the object of my invention is to improve on the invention disclosed in said patent, by providing a different form of piston, which is easier and more cheaply made than the piston in my patent aforesaid, which gives me an increased leverage as the same revolves and while the steam is being used expansively, which enables me to simplify the packing of the parts and to thereby render said packing more certain in operation than in my former patent, and which further enables me to place the packing boxes on each side of the piston closer together, and, therefore, to cause the one in the rear of the piston to close before the one in front of the piston opens, and thereby to prevent the steam in the clearance chamber from being exhausted. And, again, since the mean effective pressure acts at an increased leverage as the piston revolves, and while the steam is being used expansively, I get an increased horse power over my former patent for the same amount of steam consumed.

A further object of my invention is to omit the clearance space between the outer and inner shells of my said former patent, and thereby to avoid the loss of steam power which said space entailed.

A further object of my invention is to provide a simple valve mechanism permitting the steam to be used expansively, and controlled by a governor and also by a handlever. In this mechanism the governor acts automatically to cut off and admit steam according to the load carried, and should the engine stop from an over-load or other cause, the hand-lever would be used to open the valve and start it again.

My invention further consists in the combination of parts hereinafter described and particularly pointed out in the claims.

Referring to the accompanying drawings forming a part of this specification.

Like letters of reference refer to like parts in all the views.

A represents a casting constituting the engine bed or frame, and provided with the bearings B at each end and in the middle of said bed, as shown. These bearings may be cast integral with the bed A, or cast separately and bolted thereon as desired.

Through said bearings extends the hollow driving-shaft C, provided with the openings or ports D, as shown, and through the said shaft and concentric therewith extends the hollow tubular valve E, provided with the ports F adapted to register with the ports D in the shaft C.

Keyed, or otherwise secured to the shaft C, are the disks F, which are chambered at G and provided with the live steam port I and exhaust port H, as shown. Each of these disks F carries a piston J, slidingly and pivotally secured to its disk by the cylindrical pivot through the center of which said piston passes, as shown. Cavities L, of suitable dimensions, are provided in each disk to accommodate the inner ends of the pistons, which ends are curved to fit corresponding swells M on the hubs of their respective disks, as shown. The disks are furthermore each provided with the radially sliding packing-blocks N around its periphery, and each block consists of the flanged plates O and P longitudinally and slidingly connected by the plate Q. Suitable passages R are provided in the body of the disks to admit steam behind the blocks N and thereby balance the pressure of the steam on the outer edges of the same. Suitable springs S are also provided, as shown, to press the blocks radially and longitudinally outward.

T represents packing-rings, one on each side of each disk, against which the flanges of the plates O, P, bear, and against which the springs press longitudinally, as shown. Said rings are cut away, of course, so as to permit the outer radial surface of the blocks to come flush with their own surfaces, and to thereby form a tight packing-joint with the flat face of the ends of the cylinder. The pistons J are also rigidly fastened at their outer ends to the revolving cylinders U, having the perforated flanged end disks V bolted or otherwise fastened to said cylinders U. The flanges W of these disks fit concentrically and exteriorily the bearings B, but said flanges and bearings B are eccentric to the shaft C, so that the shaft C is journaled concentric to the disks and eccentric to the cylinders on the interior of said bearings B, all as clearly shown in the drawings. The said bearings B are also provided with curved or turned-over lips X, which overhang the ends of said flanges W, and thereby catch any oil that may be thrown off by centrifugal force from said bearings.

To keep the parts thoroughly lubricated, I provide an oil reservoir Y, in which is pivoted a weighted roller Z, which bears upon and feeds oil to the shaft C, as shown.

At one end of the shaft C I secure a friction or other bevel gear A', which engages a corresponding bevel gear B' keyed to the vertical shaft C' which carries the centrifugal ball-governor mechanism shown and which consists of the yoked bearings C'', D'' and the top bearing E''. Said top bearing has pivoted thereto the centrifugal, weighted bell crank levers F''', which are connected to the bearing D'' by the links G'', and the bearing C'' has pivoted thereto the lever H'', which in turn is connected to the link E', as shown.

A'' is a casting supporting the governor. Loosely attached to the valve E is a weighted crank arm D', under the control of the governor through the link connection E'. The crank arm D' is so connected to the valve E, through the lever F', as will appear below, that when the engine is running too fast, the centrifugal force will spread the balls of the governor and rotate the valve E, thereby cutting off the steam, and when the engine is running too slow, the balls will close, thereby opening the valve ports by rotating the valve in an opposite direction, all as is well known and which needs no further description herein.

Figure 1:
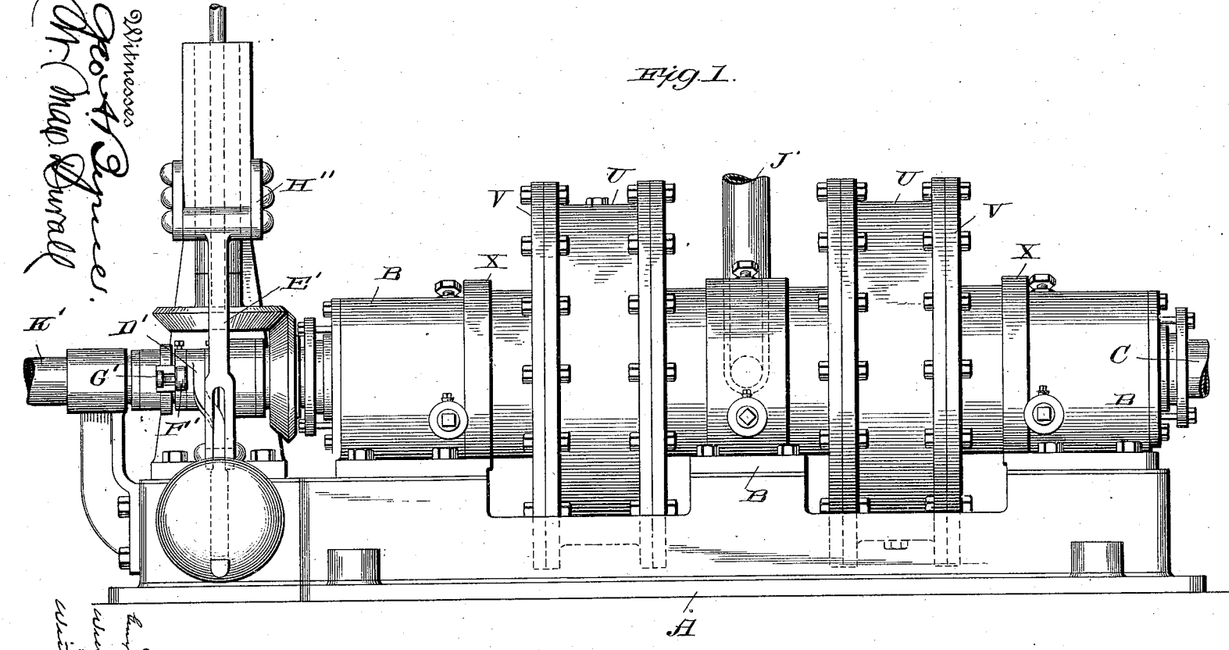
—Figure 1 represents a side elevation of my engine, the steam-pipe and shaft being broken away and parts of the governor being omitted.
Figure 16:
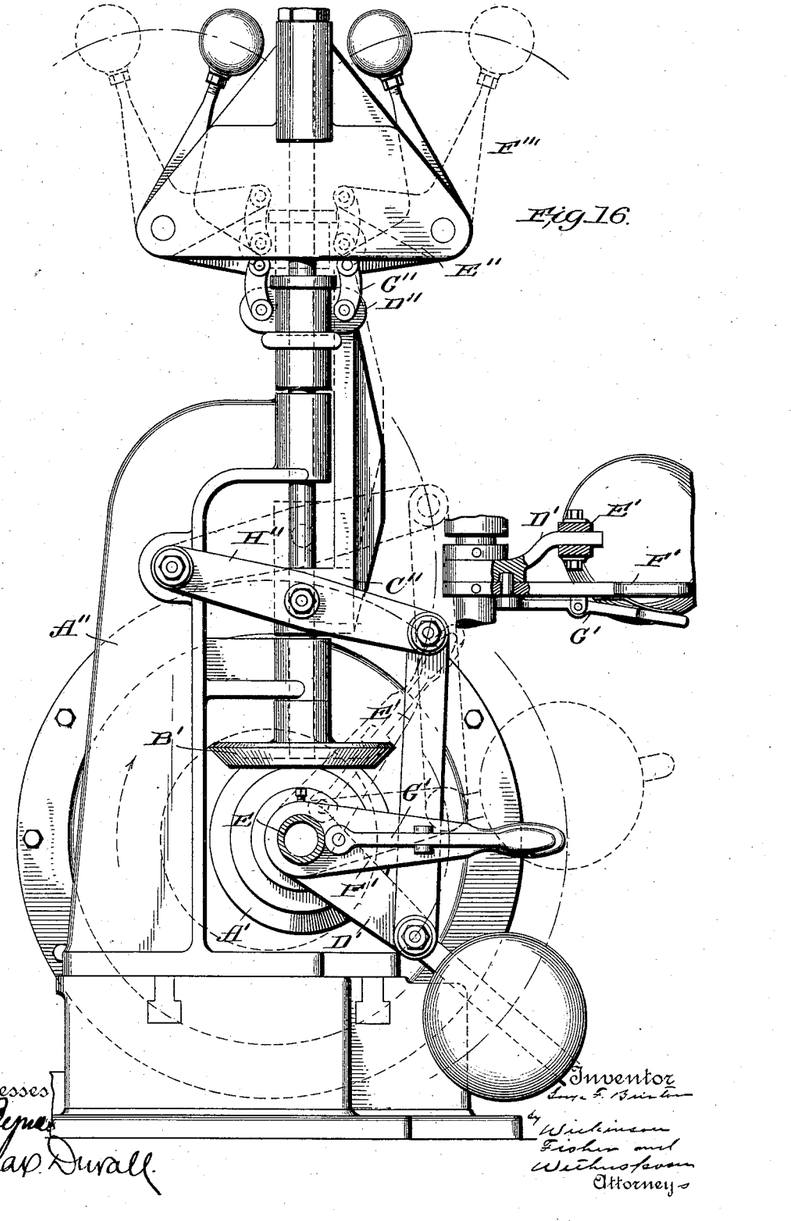
Fig. 16, an end elevational view of the engine and its governor.

As will be seen from Fig. 1 of the drawings, the weighted crank arm D', is secured to the valve E, and also in a slot provided in the lower end of link E', there being a bend as shown in said arm between the said valve and said link, in order to more effectually clear the hand lever F', which projects beyond the link E' as shown in Fig. 16. The connection between the valve and crank D', above referred to, is by means of the lock hand lever F', rigidly secured to the valve E, and provided with the pivotal locking lever G', which normally locks the said lever F' to the weighted governor-controlled lever D'. The valve E is provided with bearings H' at each end thereof, and also with packing-rings I' which fit steam-tight the interior of shaft C. Its end is closed by a screw plug, as shown. The construction it will be seen is such that if the hand lever F' be unlocked from the crank D', the valve may be turned by hand to the open or to the closed position, and when it is again locked to said crank D', the same movements may be obtained through the action of the governor alone, as above stated.

Figure 2:
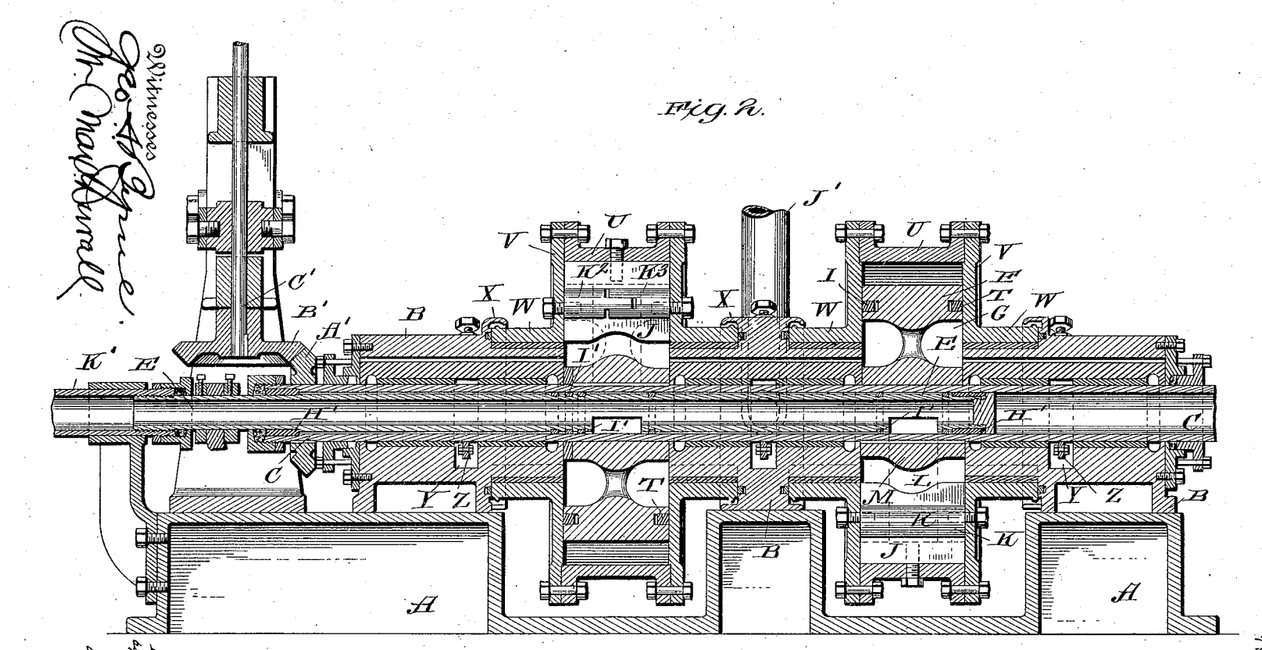
Fig. 2 is a longitudinal sectional view of my engine, showing the pistons in elevation.

K' represents a live steam pipe suitably connected with valve E in any desired manner, as for example by the packing box and loose thread connection shown in Fig. 2, and J' represents the exhaust pipe.

L' represents small longitudinal packing-blocks placed on each side of the steam ports in valve E, and M', counter balancing weights cast on, or otherwise attached to, the cylinders U.

Figure 3:
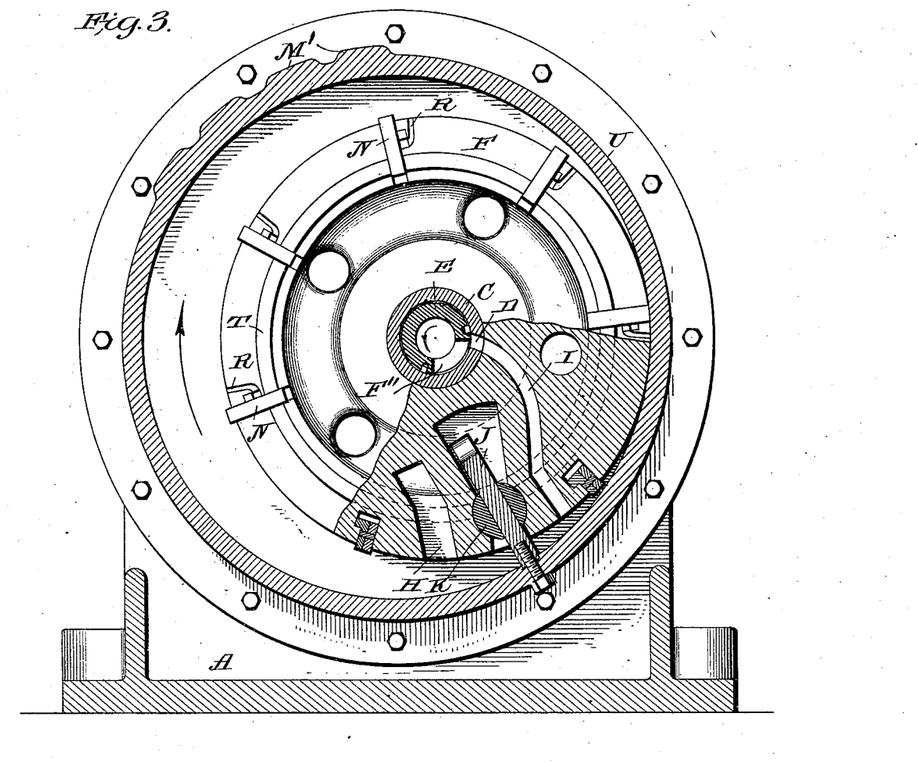
Fig. 3 is a transverse sectional view through one of the cylinders, showing the valve, the shaft, the piston and its connection with the disk in section and the disk itself partly in section.
Figure 4:
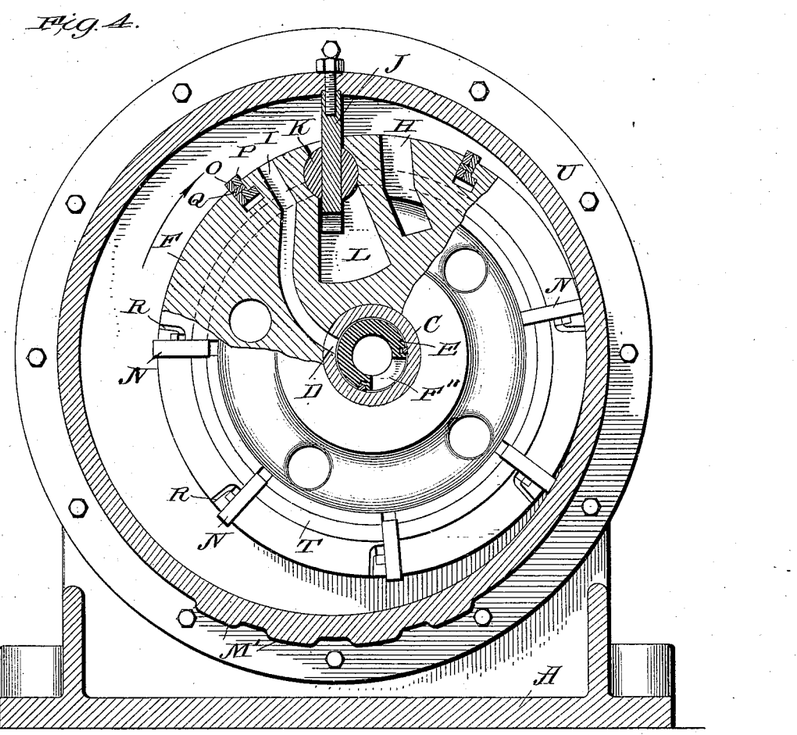
Fig. 4 is a view similar to Fig. 3, but showing the position of the parts after the piston has moved through an angle of about 180 degrees.
Figure 5:
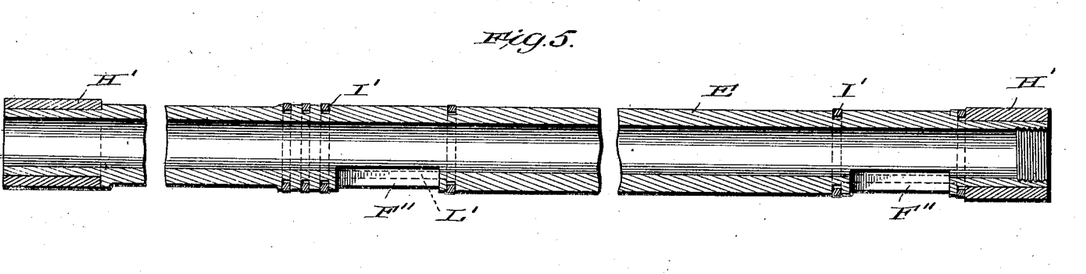
Fig. 5 is a longitudinal sectional view of the hollow valve.
Figure 6:
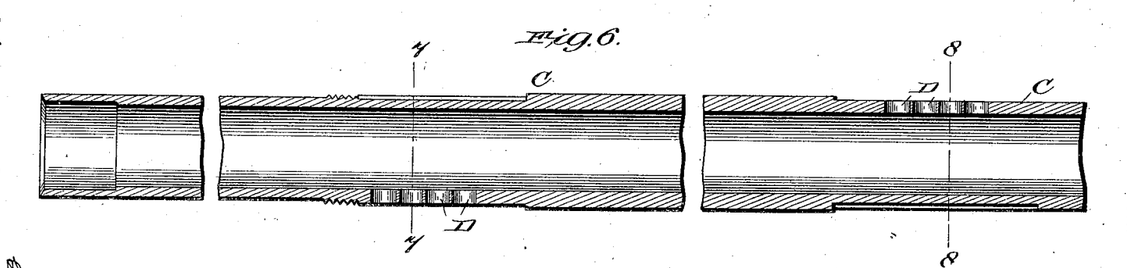
Fig. 6 is a similar view of the shaft.
Figure 7:
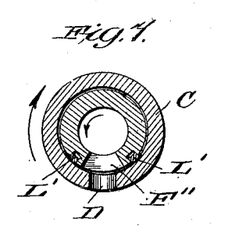
Fig. 7 a transverse sectional view of the shaft and valve, showing their respective ports in register, and Fig. 8, a similar view showing the ports after the shaft has turned 180 degrees.
Figure 8:
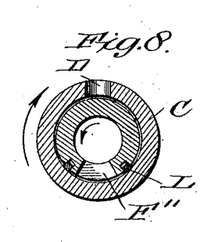
Figures 9, 10:
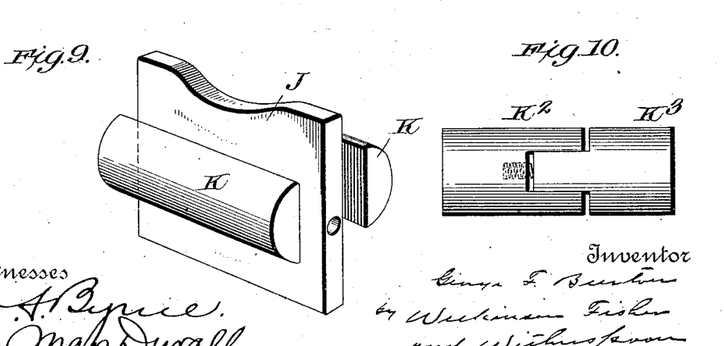
Fig. 9 is a perspective view showing the piston and its split cylindrical pivot detached.
Fig. 10 is a view showing one of the halves of said pivot formed of two parts slidably connected together.
Figure 11:
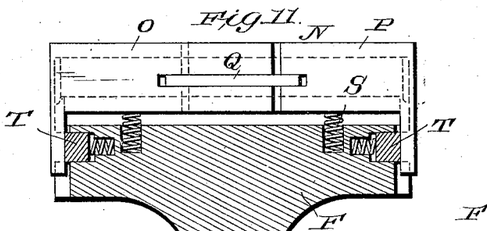
Fig. 11 is a detachable view of a pair of packing-blocks, showing their operating springs.
Figure 12:
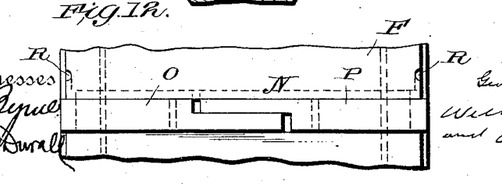
Fig. 12, a plan of the same, and Fig. 13, an end elevation of said blocks.
Figure 13:
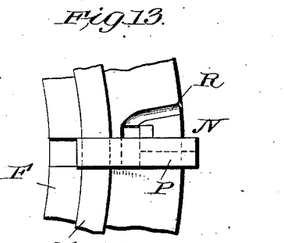
Figure 14:
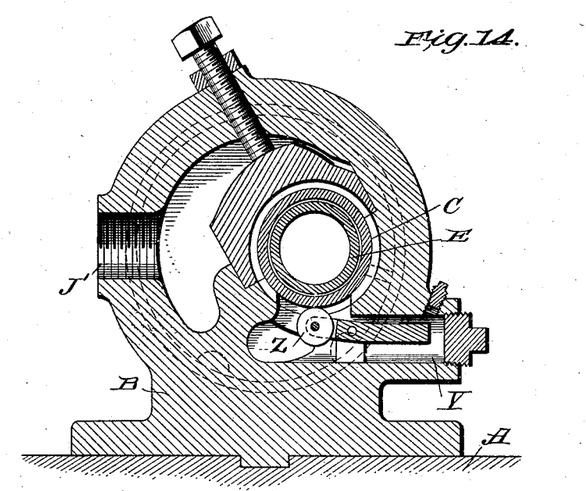
Fig. 14 is a transverse sectional view through the exhaust-pipe $J^1$ and one of the oil reservoirs of the engine.
Figure 15:
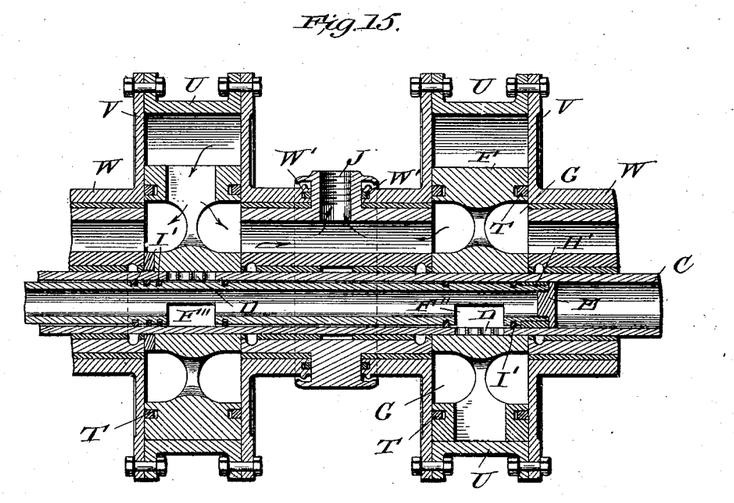
Fig. 15 is a longitudinal sectional view through the two cylinders and exhaust-pipe J'.

The operation of my engine is as follows:—
Steam enters the pipe K', passes to the ports F'' in the valve E, through the same and the ports D in the shaft C to the passage I in the disk F, and behind the piston J. The disk being concentric with the shaft C and the cylinder eccentric, as stated above, the pressure of the steam against the piston will cause the cylinder to turn on its bearings, and since the disk and piston are attached thereto, they likewise rotate with the cylinder. The piston, however, being slidingly and pivotally attached to the disk, slides outward as the cylinder revolves, and thereby increases the leverage against which the mean effective pressure of the steam acts. This feature is especially important when using steam expansively, which I contemplate doing, for I may, as shown in the Figs. 3 and 4, only extend my valve ports about 90°, and therefore as the disk revolves the steam will be automatically cut off after following the piston about one-fourth of a revolution. As the parts revolve from the position shown in Fig. 3 to that shown in Fig. 4, the packing-blocks N continually contact with and leave the inner surface of the cylinder, but one or more of the same is always in contact therewith to form an effectual barrier against the escape of live steam into the space on the opposite side of the piston. These same boxes, situated all around the periphery of the disks as well as the rings T, snugly fit against the end disks V of the cylinders at all times, and thereby prevent any escape of the steam on the sides of the revolving disks. In order to prevent any steam from escaping through and around the pivot K, that half of the same which comes on the live-steam side of the piston is made in two parts $K^2$ and $K^3$, as shown in Fig. 10, and a spring constantly presses these parts outward against the cylinder ends V. As the piston continues to revolve from the position shown in Fig. 4 on around to the initial position shown in Fig. 3, the space for the exhaust steam, between the disk and cylinder, continues to get less and finally becomes zero, just before the position in Fig. 3 is reached. The packing-boxes N next to the piston, and immediately on each side of the same, can be, and are, with this construction placed so close together that the one in the rear of the piston closes steam tight before the one in the front of the piston opens, and thereby the steam in the clearance chamber is prevented from being exhausted.

While the engine is performing work, the governor acts to open and close the valve, as is usual in engines of this character, but, in addition to this, should the engine stop while using the steam expansively, from an overload or other cause, the hand-lever F' may be used at once to rotate the valve sufficiently to admit live steam behind the piston, and thereby start the engine. After the engine starts the hand-lever is rotated into position to lock with the governor crank arm D', and the governor acts as before. As the parts revolve, the weighted rollers in the oil reservoirs V convey oil to the shaft and the same finds its way to the parts in the usual manner.

W' are small packing-rings on the flanges W of the cylinder ends or disks V, in order to prevent the escape of steam past the cylinder bearings, and M' are weighted counter balancing projections cast, on, or otherwise attached to the cylinder U.

From the foregoing it will be seen that I have entirely done away with the outside shell of my former patent and its attendant loss of steam between the same and the casing; that by employing a governor I cause the steam to be automatically cut off or admitted, according to the load carried, and thereby am enabled to make this engine run more smoothly than the engine of my said patent, and at the same time create a tendency toward a more constant torque, with an exceedingly simple mechanism. Furthermore, by having but one piston in each cylinder and steam being cut off automatically, I am enabled to get a wide range of expansion, and at the same time to get a positive pressure on each piston, and at right angles to the shaft, throughout about five-sixths of its revolution. The pressure on my packing-boxes being balanced as set forth above, the same are under the control of the springs and therefore, the tightness of the packing, as well as their friction, is under complete control.

My oil chamber and roller is so simple that it practically requires no attention, and all the parts of the engine are so shaped that they may be readily machined, assembled and disassembled, thereby making the same easy of production and easy to take out or replace when repairs are necessary.

Having thus described my invention, what I claim and desire to secure by Letters Patent is:—

1. In a rotary engine, the combination of a shaft, a disk secured concentric thereto and provided with the live steam port I leading from its center, a cylinder eccentric to said shaft and a piston rigidly attached to one of said parts and pivotally and slidingly attached to the other, substantially as described.

2. In a rotary engine, the combination of a revolving shaft, a disk rigidly secured concentric thereto and provided with a live steam port leading from its center to its circumference, a revolving cylinder eccentrically disposed relative to said shaft, and a piston rigidly attached to one of said parts and movably attached to the other, substantially as described.

3. In a rotary engine, the combination of a shaft a revolving disk secured concentric thereto and provided with a live steam port leading from its center to its circumference, a revolving cylinder having bearings eccentric to said shaft, and a piston slidingly and pivotally secured to said disk and rigidly secured to said cylinder, substantially as described.

4. In a rotary engine, the combination of a revolving shaft, a revolving disk secured concentric to said shaft and provided with an admission port leading from its center and an exhaust port leading from its circumference, a revolving cylinder eccentric to said shaft and a piston secured to said disk and to said cylinder, substantially as described.

5. In a rotary engine, the combination of a revolving shaft provided with a steam port, a revolving disk rigidly and concentrically attached thereto, and provided with an exhaust port, a revolving cylinder eccentrically disposed with relation to said shaft and a piston rigidly attached to said cylinder and slidingly and pivotally attached to said disk, substantially as described.

6. In a rotary engine, the combination of a hollow shaft, a disk concentric therewith, a cylinder eccentric thereto, a piston rigidly connected to said cylinder and also connected to said disk, a valve disposed in said shaft and a governor for said valve, substantially as described.

7. In a rotary engine, the combination of a hollow shaft, a rotary disk concentric therewith, a rotary cylinder eccentric thereto, a piston rigidly connected to said cylinder and slidingly connected to said disk, a rotary valve disposed in said shaft and a governor for said valve, substantially as described.

8. In a rotary engine, the combination of a hollow shaft, a rotary valve disposed therein, a disk concentric to said shaft, a cylinder eccentric to said shaft, a piston attached to said disk and cylinder, a governor mechanism for said valve, and means whereby said valve may be operated by hand independently of said governor, substantially as described.

9. In a rotary engine, the combination of a hollow shaft, a rotary valve disposed therein, a disk concentric to said shaft, a cylinder, a piston attached to said disk and cylinder, a governor mechanism for said valve, and a hand lever whereby said valve may be operated by hand independently of said governor, substantially as described.

10. In a rotary engine, the combination of a hollow shaft, a rotary valve disposed therein, a disk concentric to said shaft, a cylinder eccentric to said shaft, a piston attached to said disk and cylinder, a governor mechanism for said valve, and a hand lever adapted to engage and disengage said governor mechanism whereby said valve may be operated by hand independently of said governor, substantially as described.

11. In a rotary engine, the combination of a shaft, a disk concentric thereto, a rotatable cylinder eccentric to the same, a piston connecting said cylinder and disk, and said disk being provided with balanced packing boxes around its periphery, substantially as described.

12. In a rotary engine, the combination of a shaft, a disk concentric thereto, a cylinder eccentric to the same, a piston connected to said disk and cylinder and said disk being provided with balanced packing boxes consisting of two plates slidably attached to each other and having actuating springs for pressing the same outward, substantially as described.

13. In a rotary engine, the combination of a shaft, a disk concentric thereto, a counterbalanced cylinder eccentric to the same, a piston connected to said disk and cylinder, said disk being provided with balanced packing boxes consisting of two plates slidably attached to each other and having actuating springs for pressing the same outward, a valve and a governor mechanism controlling the same, substantially as described.

14. In a rotary engine, the combination of a hollow shaft, a disk concentric therewith, a cylinder eccentric thereto, a piston rigidly attached to said cylinder, and provided with a split cylindrical pivot slidingly and pivotally connecting the same with said disk, said pivot having one of its halves made in two parts slidingly connected together, and said disk provided with balanced packing boxes around its periphery, a hollow valve in said shaft, and a governor mechanism controlling said valve, substantially as described.

15. In a rotary engine, the combination of a hollow shaft, a disk concentric therewith, a cylinder eccentric thereto, a piston rigidly attached to said cylinder, and provided with a split cylindrical pivot slidingly and pivotally connecting the same with said disk, said pivot having one of its halves made in two parts slidingly connected together, and said disk provided with balanced packing boxes around its periphery, a hollow valve in said shaft, and a governor mechanism controlling said valve, and a hand mechanism for operating said valve independently of said governor mechanism, substantially as described.

16. In a rotary engine the combination of a hollow shaft, a valve located therein, a disk, a cylinder, a piston rigidly attached to said cylinder and pivotally and slidably attached to said disk, bearings for said shaft, an oil reservoir, and means in the same for contacting with said shaft and thereby causing the parts to be lubricated, substantially as described.

17. In a rotary engine, the combination of a shaft, a disk having a live steam port leading from its center and provided with a clearance and an exhaust port space concentric therewith, a cylinder eccentric thereto, a piston connected to both said cylinder and disk, and means whereby the steam in the said clearance space is prevented from escaping into said exhaust port, immediately before live steam is admitted to said cylinder, substantially as described.

18. In a rotary engine, the combination of a shaft, a cylinder eccentric thereto, a disk, a piston rigidly attached to said cylinder, a valve controlling the admission of steam to said cylinder, a governor for said valve, a hand-lever and means to connect and disconnect the same from said governor, whereby the valve may be operated either automatically through said governor or by hand independently thereof, substantially as described.

In testimony whereof, I affix my signature, in presence of two witnesses.

GEORGE F. BURTON.

Witnesses:
W. J. WALDROP;
H. L. VINES.